United States Patent [19]

Johnson et al.

[11] 4,032,289

[45] June 28, 1977

[54] CONVECTION OVEN

[75] Inventors: David E. Johnson, Minneapolis; Terrance E. Polsfuss, Clear Lake, both of Minn.

[73] Assignee: Despatch Industries, Inc., Minneapolis, Minn.

[22] Filed: Sept. 8, 1975

[21] Appl. No.: 610,981

[52] U.S. Cl. .............................. 432/200; 34/191; 432/205
[51] Int. Cl.² .......................................... F27B 5/16
[58] Field of Search .......... 432/199, 200, 201, 203, 432/204, 205; 34/191

[56] References Cited

UNITED STATES PATENTS

| 1,767,614 | 6/1930 | Puening | 34/191 X |
|---|---|---|---|
| 2,414,312 | 1/1947 | Lee | 432/199 |
| 2,704,242 | 3/1955 | Strauss | 432/200 X |
| 3,309,073 | 3/1967 | Guingand | 432/200 X |
| 3,324,844 | 6/1967 | Huffman | 432/199 X |

Primary Examiner—John J. Camby
Attorney, Agent, or Firm—Warren A. Sturm; James R. Haller

[57] ABSTRACT

A convection oven of the rack type for treating goods, e.g., baking bread, including a rotating duct which sequentially delivers heated air to a series of ducts which distribute the heated air across the oven chamber according to a flow pattern which provides uniform treatment of the goods while maintaining the goods and the rack stationary with respect to the oven chamber.

17 Claims, 7 Drawing Figures

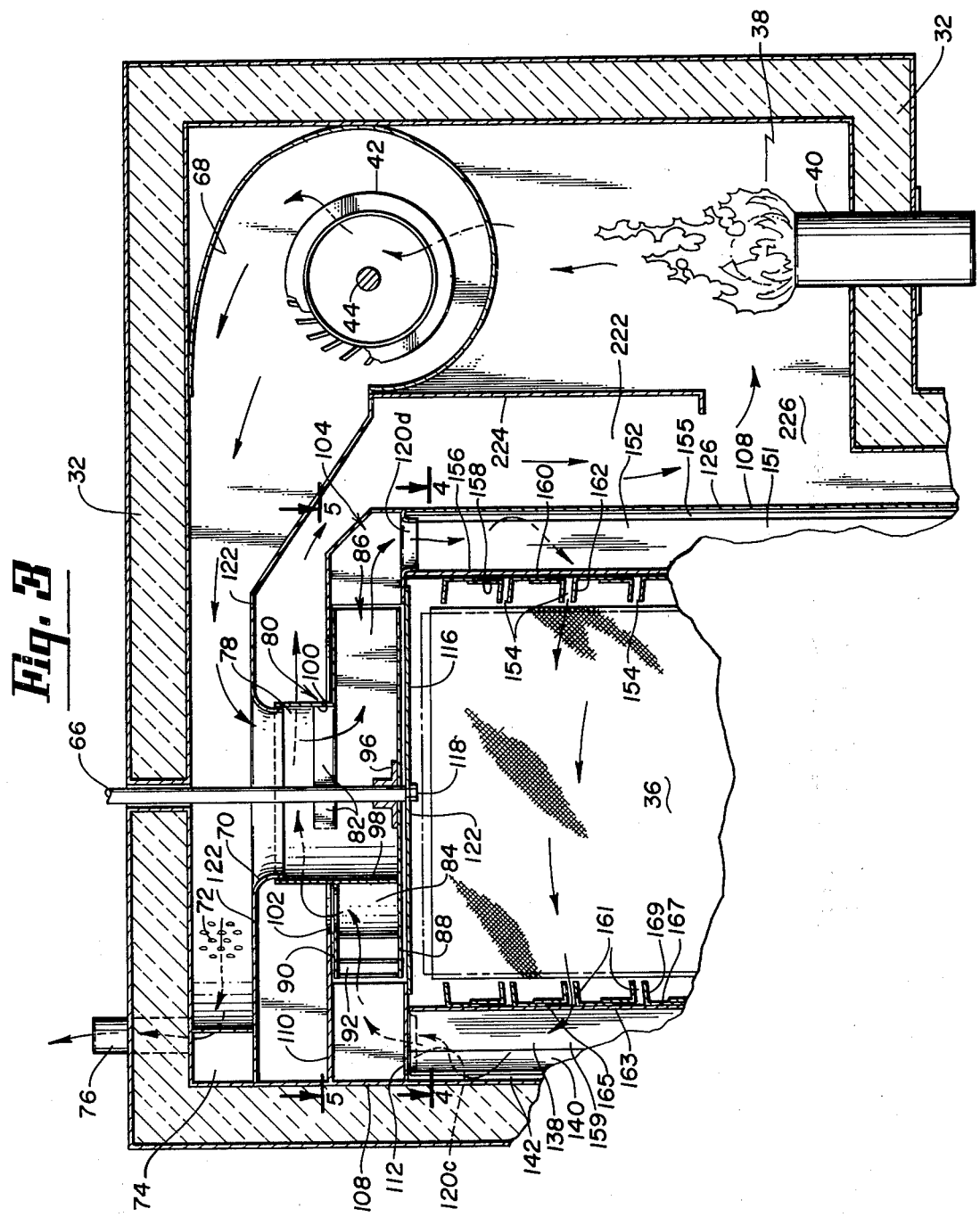

CONVECTION OVEN

This invention relates to rack ovens, and more particularly, to convection rack ovens, that is, ovens having a chamber for receiving a rack loaded with goods to be treated by a moving current of gaseous fluid.

BACKGROUND OF THE INVENTION

The typical rack oven provides a chamber for discontinuous baking or otherwise treating goods placed on a rack which is generally wheeled into the chamber. Air or other gaseous fluid is circulated within the chamber to treat the goods, e.g., bake or thaw. Uniform treatment is required to properly prepare most goods. Several means have been devised for accomplishing uniform treatment.

A recent development is described in U.S. Pat. No. 3,641,945 wherein the chamber is equipped with a drive member which lifts the rack from the oven floor and rotates the rack in a continuous path to insure uniform treatment. Such an oven requires several moving parts, many of which are exposed to the goods under treatment. Health standards require that the oven be maintained in a clean condition, and the presence of such exposed mechanism hinders the cleaning operation to a large degree. Moreover, the lifting and rotating mechanism requires numerous controls and the like which further complicates the operation of the oven.

It is an object of this invention to provide a rack oven affording a uniform treatment of the goods. A more specific object is to provide a rack oven affording uniform treatment of the goods which is simple, easily cleaned, and eliminates numerous moving parts.

These and other objects are provided in the present invention by an oven comprising an oven chamber for receiving goods to be treated, conduit means, rotor means for sequentially delivering gaseous treating medium to said conduit means during rotation of said rotor means, said conduit means communicating with said oven chamber for conveying said medium to said oven chamber according to a predetermined flow pattern providing substantially uniform treatment of said goods.

The conduit means with which the rotor means communicates may include a series of intercommunicating elements which provide a passage for the gaseous treating medium from the rotating member to the chamber containing the racked goods. The combination of all such series of elements produces a pattern of flow across the oven chamber which provides uniform treatment of the goods. A series of elements may include a stationary member which receives the treating medium directly from the outlet of the rotor means and conveys the medium to a vertical extending duct via a nozzle extending into the duct. From the duct, the medium exits through a port leading to a louvered wall defining one of the sides of the oven chamber. The medium passes through the louvers and across the chamber where it exits from the chamber through opposing louvers. The spent medium retraces its path through a second series of like elements except that the rotor means is bypassed and the spent medium returned via recirculating ducting to a chamber where the medium is reinstated to its treating condition. Neither the goods being treated nor the rack upon which the goods are placed need be moved during the treatment.

BRIEF DESCRIPTION OF THE DRAWINGS

In the Drawings:

FIG. 3 is a sectional view of the oven with portions cut away;

DESCRIPTION OF THE PREFERRED EMBODIMENT

Figure 2:
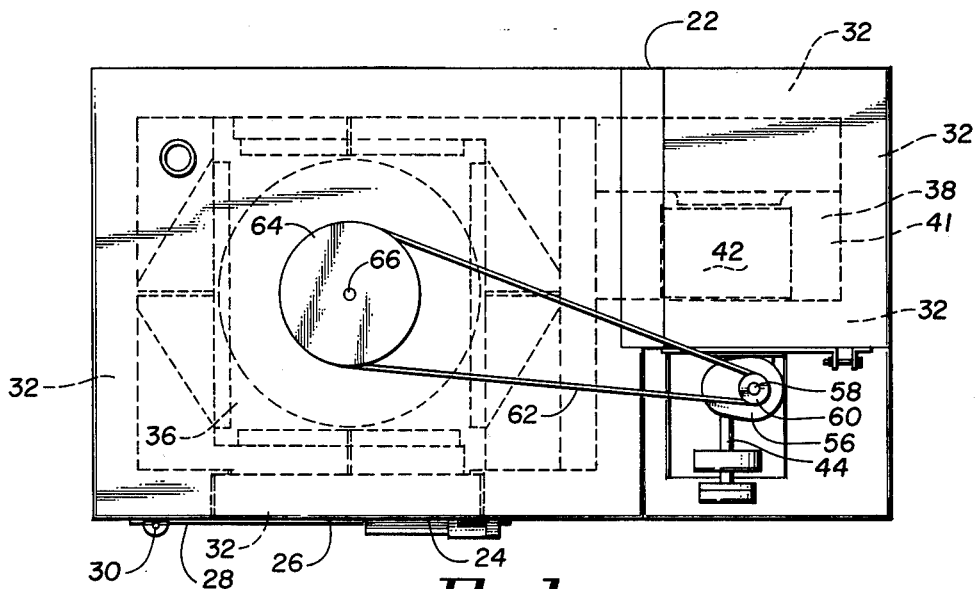
FIG. 2 is a plan view of the oven.
Figure 1:
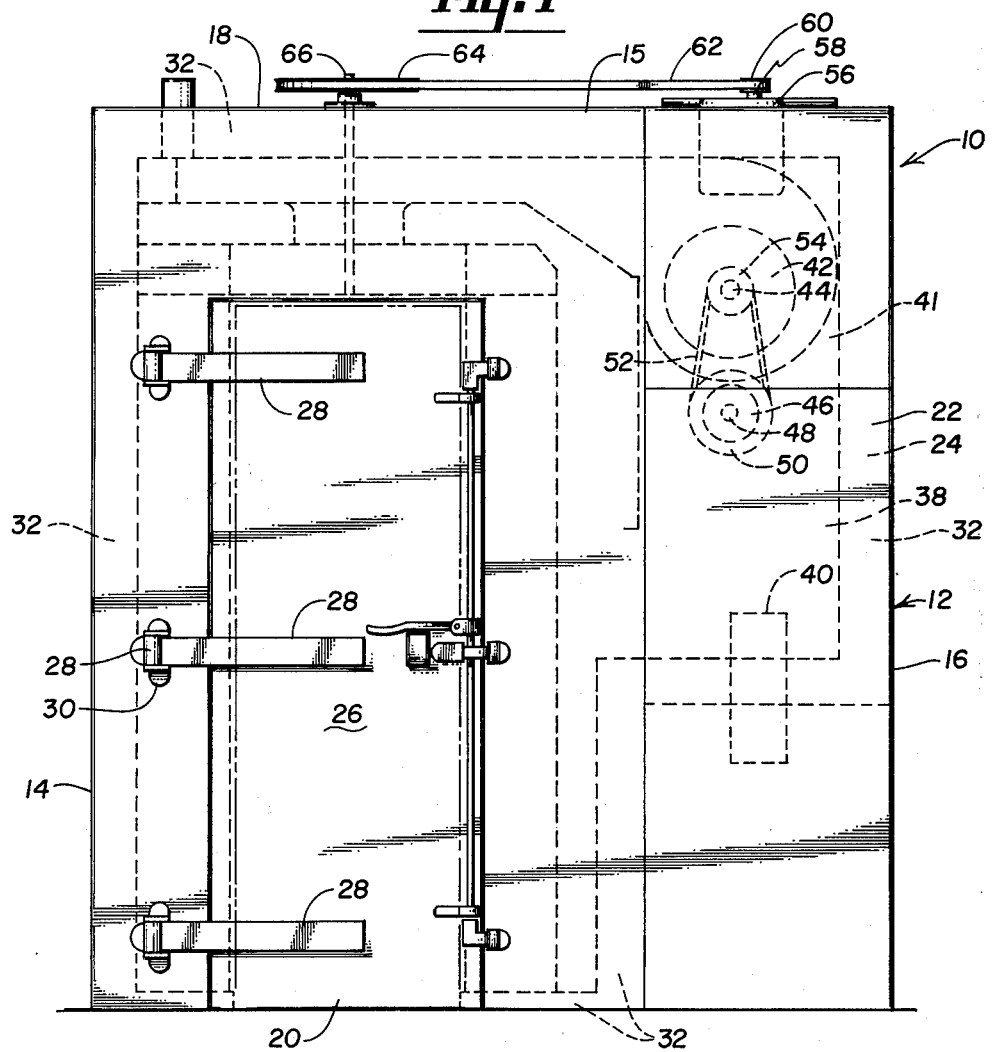
FIG. 1 is a front elevation of a convection rack oven of the invention.

Referring to FIGS. 1 and 2, the rack oven 10 includes a housing 12 comprised of side walls 14 and 16, top and bottom walls 18 and 20, respectively, rear wall 22, and front 24. Front 24 includes a door 26 mounted on hinges 28 fitted with pins 30. Insulation is located in sections 32. Located behind door 26 is oven chamber 36 dimensioned to receive the rack of goods to be treated. To the right of chamber 36 is compartment 38 in which is housed burner 40 (a suitable burner is available under the trade designation Model 208 Maxon Ovenpack burner). A suitable air intake valve (not shown) is provided to assure an adequate supply of gaseous treatment fluid. Spaced above burner 40 in compartment 41 is a squirrel cage blower 42 mounted on shaft 44. Blower 42 is driven by motor 46 having drive shaft 48. Keyed to drive shaft 48 is pulley 50 connected by belt 52 to pulley 52 keyed on shaft 44. Mounted above blower 42 and towards the front of oven 10 is a rotor motor 56 equipped with shaft 58 to which is keyed pulley 60. Mounted on pulley 60 is drive belt 62 leading to pulley 64 keyed to rotor shaft 66.

As best shown in FIG. 3, heated gaseous fluid emanating from squirrel cage blower 42 is conveyed through a scroll duct 68 having a chute 70 beyond which are located a plurality of openings 72 which communicate via space 74 with exhaust chimney 76. Chute 70 communicates with upper rotor section 78 of rotor member 80. Chute 70 extends into the interior of upper rotor section 78 and is also biased from the inner wall of section 78. This relationship of chute 70 to upper rotor section 78 provides a frictionless fit of the two elements eliminating the need for a contact seal between such elements. Rather, a dynamic or choke seal is provided whereby the gaseous fluid passes into upper section 78 and thence through passages explained hereinafter in the course of treating the racked goods. Upper section 78 of rotor 80 is fixedly attached to rotor shaft 66 by means of fins 82 (see FIG. 5). Upper section 78 is also fixedly attached to lower rotor section 84. Lower rotor section 84 provides an exit opening 86 (see FIG. 5) with which upper rotor section 78 communicates to provide a passage through rotor 80 to exit opening 86.

Figure 5:
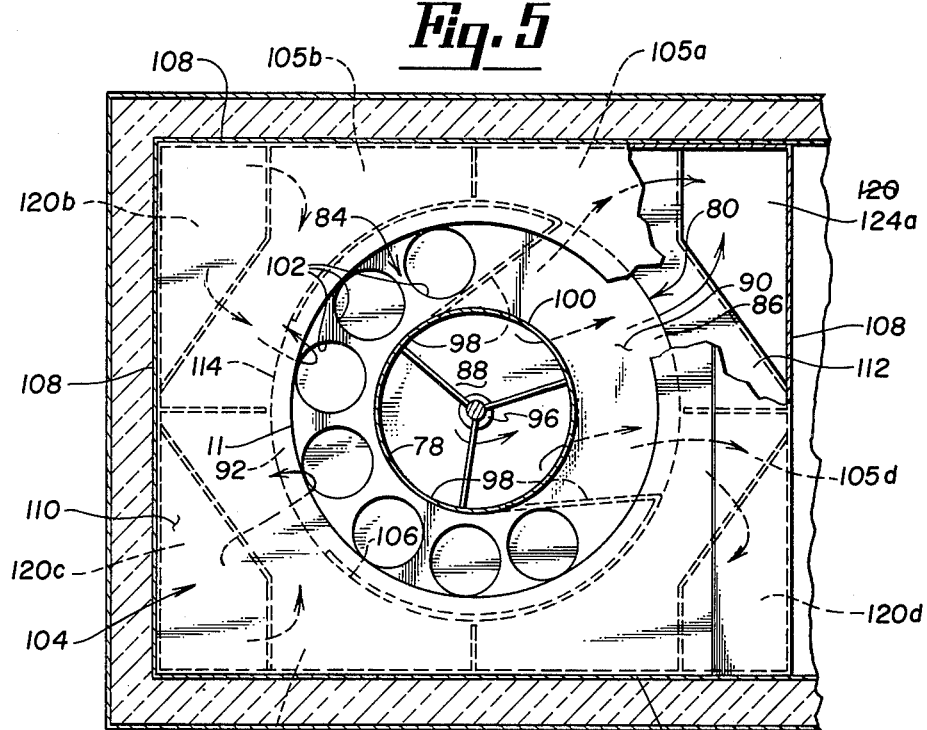
FIG. 5 is a sectional view taken along line 5—5 of FIG. 3.

Lower rotor section 84 includes a bottom plate 88 and top plate 90 in parallel, spaced relationship. A return opening 92 is located in lower rotor section 84 opposite to and isolated from exit opening 86. Bottom plate 88 is solid except for the opening through which rotor shaft 66 extends. Rotor hub 96 provides an attachment between shaft 66 and bottom plate 88. The closed passage from upper rotor section 78 to opening 86 is provided by wall 98 of section 78 which extends down to bottom plate 88 and wall 100 which extends only to top plate 90. Wall 98 also isolates exit and return openings 86 and 92, respectively. Top plate 90 is provided with a plurality of circular openings 102, preferably uniformly distributed around top plate 90 as shown in FIG. 5.

Fitted around lower rotor section 84 is a stator duct 104 composed of quadrants 105a–105d. Duct 104 has an interior circumferential extending opening 106 facing lower rotor section 84. As shown in FIG. 3, opening 86 of lower rotor section 84 is adjacent and communicates with opening 106 of stator duct 104. Stator duct 104 has solid (closed) exterior walls 108, and opposing top and bottom plates 110 and 112, respectively. Top and bottom plates 110 and 112 are provided with central openings 114. Bottom plate 112 of stator duct 104 is provided with nozzles 120a–120d at each of the four corners. Mounted to bottom plate 112 of stator duct 104 is a cover plate 122 which covers central opening 116. Rotor shaft 66 extends through cover plate 122 into lower bearing 118 to maintain the rotor in a centered configuration.

Figure 4:
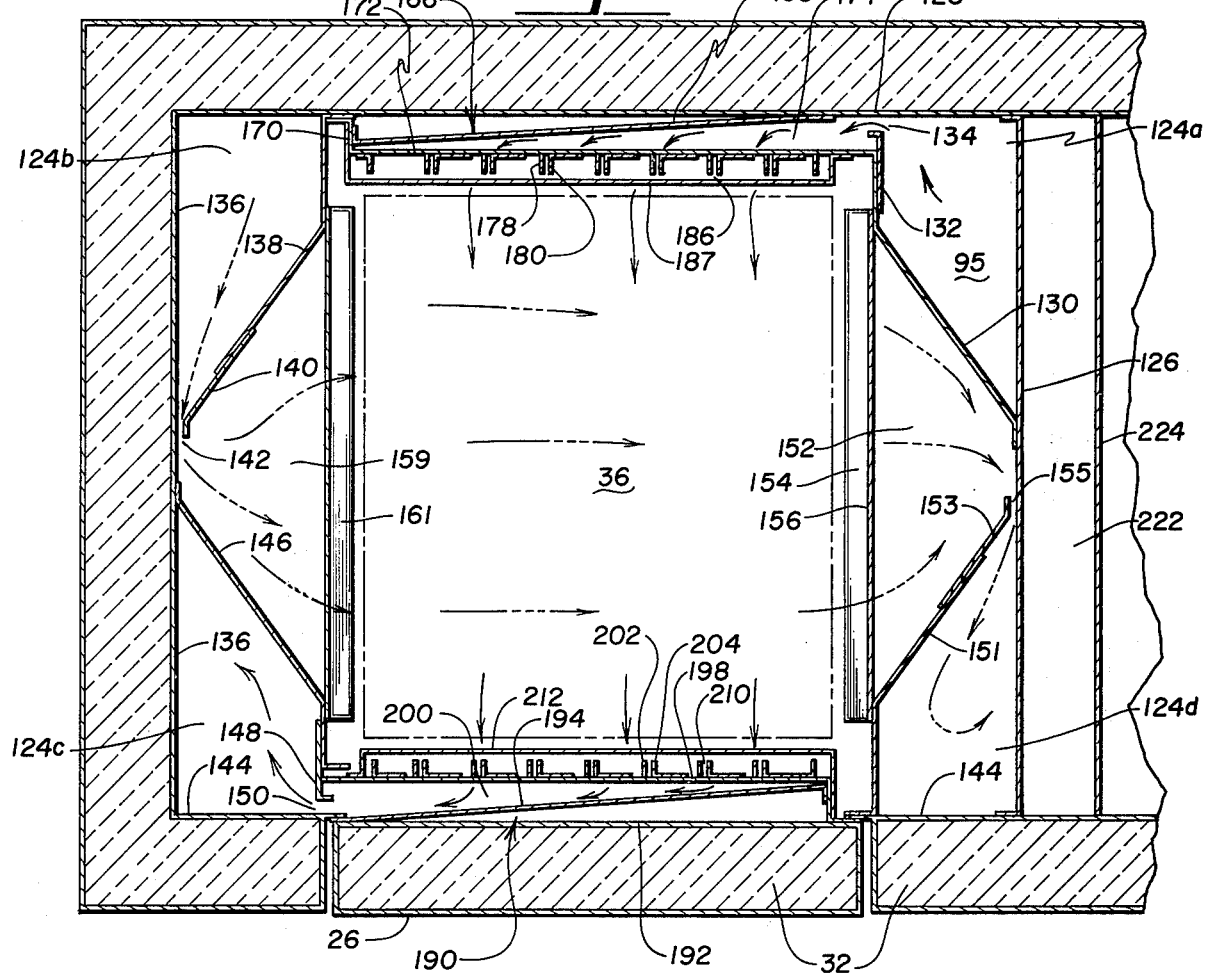
FIG. 4 is a sectional view taken along line 4—4 of FIG. 3.

FIG. 4 illustrates the duct network surrounding oven chamber 36. In each of the four corners are vertical extending ducts 124a–124d. Nozzles 120a–120d of stator 104 communicate with ducts 124a–124d, respectively. Duct 124a is defined by side wall 126, rear wall 128 and front plate 130. One end of front plate 130 is joined to wall 126. To other end of plate 130 is mounted a slotted plate 132 which is slidably adjustable to provide a vertically extending, variable space 134. Duct 124b is defined by rear wall 128, side wall 136, and front plate 138. One end of front plate 138 is joined to rear wall 128. To the other end of plate 138 is mounted a slotted plate 140 which is slidably adjustable to provide a vertically extending, variable space 142. Duct 124c is defined by side wall 136, front wall 144, and front plate 146. Front plate 146 is joined to side wall 136. To the other end of front plate 146 is mounted a slotted plate 148 which is slidably adjustable to provide a vertically extending, variable space 150. Duct 124d is defined by side wall 126, front wall 144 and front plate 151. Front plate 151 is joined at one end to wall 144. To the other end of plate 151 is mounted a slotted plate 153 which is slidably adjustable to provide a vertically extending, variable space 155. As can be seen, ducts 124a and 124c are mirror images as are ducts 124b and 124d.

Forward of ducts 124a and 124d is a triangular-shaped chamber 152 across the front of which is located a bank of horizontally disposed lourvers 154 extends from the floor to the ceiling of chamber 36 (see FIG. 3). Louvers 154 are provided by a mounting plate 156 and a series of top plates 158 and bottom plates 160 each having a flange 162. Flanges 162 are preferably parallel to one another and join their respective bases at an angle between 90° and 120°, preferably slightly greater than 90° such that openings provided by adjacent flanges 162 are slightly upwardly directed. An angle of about 95° (5° above the horizontal) has proved particularly suitable. The purpose of providing this slight upward tilt to the louvers 154 is to direct the gaseous fluid against the bottom of the shelves upon which the goods to be treated are positioned. This has been shown to provide a pleasing browning of the underside of the goods in the case of a baking operation.

Forward of ducts 124b and 124c is a triangular-shaped chamber 159 identical to chamber 152. Across the front of chamber 159 is located a bank of horizontally disposed louvers 161 identical to louvers 154. Louvers 161 are defined by a mounting plate 163 and a series of top plates 165 and bottom plates 167 each having a flange 169 identical to flanges 162.

Between ducts 124a and 124b is a rear duct 166 which communicates with vertical duct 124a via space 134. Rear duct 166 includes baffle plate 168 which is joined to rear wall 128 adjacent space 134 and extends inwardly from that juncture to flange 170 of louver mounting plate 172 to provide a tapered space 174 for passage of treated gaseous fluid. Forward of baffle plate 168 is louver mounting plate 172 to the front of which is mounted slotted louver plates 178 and 180 having flanges defining vertically extending slots 186 for passage of gaseous treating fluid. Preferably, the flanges are perpendicular to mounting plate 172 so that slots 186 direct the fluid at a 90° angle to rear wall 128. Louver plates 178 and 180 are independently adjustable to provide vertical slots 186 of varying widths. Located forward of rear duct 166 is perforated grate 187. Grate 187 contains a plurality of staggered circular apertures described as one eighth inch (0.3 cm.) holes on three sixteenths inch (0.5 cm.) staggered centers. A typical width for slots 186 is one fourth inch (0.6 cm.), however, as will be explained hereinafter, this width is generally varied at least for certain slots in order to achieve uniform treatment of the goods.

Directly across from rear duct 166 is a front duct 190 mounted on the back of door 26. Front duct 190 is a mirror image of duct 166 and includes back plate 192 to which is joined one end of baffle plate 194. Baffle plate 194 angles inwardly to a juncture with flange of louver mounting plate 198 to provide a tapered space 200 for passage of treated gaseous fluid. Forward of baffle plate 194 is louver mounting plate 198 to the front of which are mounted slotted adjustable louver plates 202 and 204. The flange portions of plates 202 and 204, respectively, define vertically extending slots 210 which may be independently varied in width by lateral sliding of louver plates 202 and 204. A grate 212 identical to grate 187 is mounted forward of front duct 190.

Figure 6:
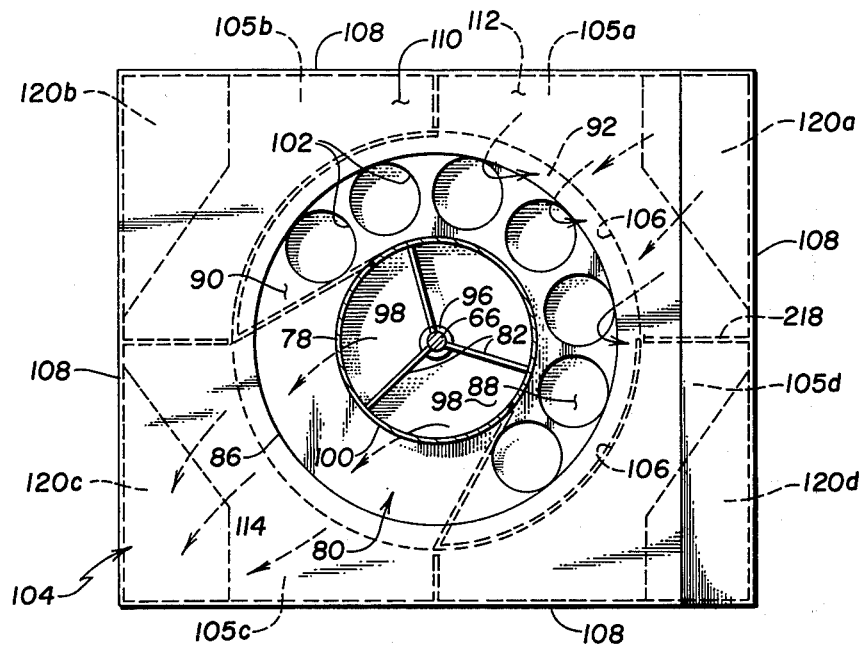
FIG. 6 is a plan view illustrating elements of FIG. 5 with parts rotated to a different position.
Figure 7:
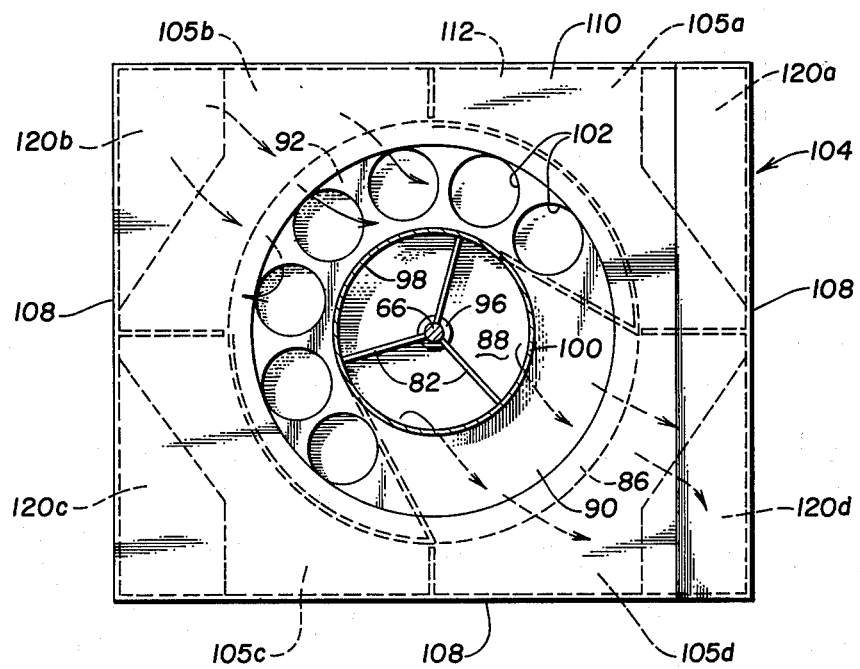
FIG. 7 is a plan view illustrating elements of FIGS. 5 and 6 with parts further rotated to a different position.

The oven 10 operates in the following manner. The burner 40, blower motor 46, and rotor motor 56 are turned on. The treating fluid, typically air, is heated by burner 40 and travels into squirrel cage blower 42 from which it exits at a velocity of about 3,000 feet/minute into scroll duct 68 through chute 70 into upper rotor section 78 to lower rotor section 84 and out opening 86. From opening 86 the heated air flows into one or two adjacent stator nozzles 120 depending upon the rotational orientation of opening 86 relative to the stator nozzles 120. FIGS. 5–7 illustrate various orientations of opening 86. In general, the heated air will have a symmetrical flow, i.e., air entering a vertical duct will circulate through the oven chamber and into the diagonally located vertical duct and return for reheating via a route described hereinafter.

In FIG. 5 exit opening 86 is directed to both quadrants 105a and 105d of stator duct 104 with slightly more of opening 86 directed to quadrant 105a. An amount of heated air directly proportional to the extent of opening 86 facing quadrant 105a will flow into nozzle 120a through vertical duct 124a past space 134 through vertical slots 186 of rear duct 166 and the openings of grate 187 across oven chamber 36 past the goods to be treated through grate 212 and vertical slots 210 into tapered space 200, and through vertical space 150 up vertical duct 124c. A second quantity of air, proportionally less than that which passed down nozzle 120a, will pass down nozzle 120d into vertical duct 124d past space 155 into chamber 152 through horizontal louvers 154 into oven chamber 36 at an upwardly directed angle. The heated air will impinge upon the bottom of the pans bearing the goods to be treated and rebound at a downward angle toward horizontal louvers 161 past vertical space 142 up vertical duct 124b.

In FIG. 6, opening 86 of rotor 80 is directed only toward quadrant 105c of stator duct 104. As can be seen, opening 86 is the same size as one of the stator quadrants 105 each of which is divided by a bulkhead 218. Heated air travels down upper rotor section 78 through opening 86 in lower rotor section 84 into nozzle 102c. From nozzle 102c the heated air travels to vertical duct 124c, exiting at space 150 adjacent duct 190. From space 150, the air travels through the slots 210 and grate 212 across oven chamber 36 through grate 184 and slots 186 of rear duct 166 along tapered space 174 through space 134 into vertical duct 124a to nozzle 120a.

In FIG. 7, heated air enters vertical duct 124d from nozzle 120d. The heated air exits from duct 124d at space 155, passes through horizontal louvers 154, across oven chamber 36, through horizontal louvers 161 and into vertical duct 124b via space 142 and from there to nozzle 120b.

In FIG. 4, the air flow pattern includes a wave from rear to front and from left side to right, such as would be produced if, at one moment in time, opening 86 was supplying heated air to both nozzles 120a and 120b. Such an air flow pattern is also typical of that produced when opening 86 is rotated from nozzle 120a to 120b. As is apparent from the foregoing, sequential rotation of opening 86 causes heated air or other gaseous treatment fluid to flow into each of the stator nozzles 120a–120d and eventually results in air flow from side to side (counter-current) and end to end (countercurrent) providing an overall crosscurrent flow pattern which affords substantially uniform treatment of the racked goods.

After the treatment medium, generally heated air, has passed through the oven chamber 36 and returned to a nozzle 120a–120d located diagonally to the nozzle 120a–120d fed by opening 86, the medium routes its way back to compartment 38 for reheating and recirculation, along with fresh air acquired through an intake not shown. This return route includes, in sequence, return opening 92, circular openings 102 in top plate 90 of lower rotor secton 84, and return duct 222 which surrounds upper rotor secton 78 and descends through a passage defined by the bottom plate of scroll duct 68 and partial wall 224 on one side and wall 126 on the other and into compartment 38 via opening 226.

The width of vertical spaces 134, 142, 150 and 155, horizontal slots of horizontal louvers 154 and 161, and the vertical slots 186 and 210 may be adjusted as desired to provide a uniform treatment of the racked goods. The vertical spaces or the louvers or both can be adjustable, preferably both. A typical width for the vertical spaces 134, 142, 150, and 155 is about 2.5 cm., and about 0.5 cm. for the horizontal slots of louvers 154 and 161, and the vertical slots 186 and 210. The squirrel cage blower 42 may operate over a broad range, with typical air velocities being on the order of 500–1,200 feet/minute at the point of the louver exits.

The rotor which distributes the heated air to the conduit system or network, which includes the stator duct, vertical ducts, and louvers, typically rotates at about one half r.p.m. As is evident from the foregoing description, the rotor provides the dual functon of distributing the treating medium to the conduit system and providing an opening for the return of spent treating medium to the burner chamber for recirculation. The rotor may rotate continuously or discontinuously at a constant or irregular rate. The return system for the treating medium is essentially 180° out of phase with the distribution system.

The gaseous treating medium exits from the louvers in such a manner as to provide a vertically extending moving curtain of the medium across the oven chamber. The dwell time of the rotary duct, i.e., the time the rotary duct supplies treating medium to any one of the louvers located along the oven chamber walls, is determined by the treating requirements of the racked goods. Thus, if, for example, a baking operation is relatively short, a long dwell time should be avoided since exposure to the treating medium from any one directon will have a relatively greater effect on the goods than if the total treating time is long. The flow pattern in the embodiment described is symmetrical with respect to the goods to be treated, and occurs sequentially from one wall to its opposing wall such that in one complete revolution a first flow is produced from a first wall to a third opposing wall followed by a second flow from a second wall to a fourth opposing wall. The second flow is crosscurrent (90°) to the first flow and is followed by a third flow countercurrent (180°) to the first flow followed by a fourth flow countercurrent to the second flow. Each of the flows provides essentially the same treating effect on the goods.

The arrangement of the louvers as shown on the drawings is preferred. However, it is to be understood that the openings provided by the louvers may be horizontal, vertical, or otherwise angled as desired to provide the uniform treatment of the goods.

It has been found that the rack oven of this invention, with its rotor member above described, is highly benefited by having, on opposing walls of the oven chamber, one or more louvers having longitudinally extending openings with an upward pitch, relative to the horizontal, of more than 0° and no more than about 30°. Upwardly pitched louvers on one or more oven chamber walls may also be utilized in conventional rack ovens not having the rotor member of this invention; for example, a rack oven wherein the rack bearing the goods is moved rather than rotating the treating medium so to speak, as in the present invention.

We claim:

1. A convection oven comprising an oven chamber for receiving goods to be treated, conduit means providing a plurality of paths for conveying gaseous treating medium to the oven chamber and respectively opening into the chamber about the chamber periphery, and rotor means for sequentially delivering gaseous treating medium to said paths during rotation of said rotor means to distribute said medium to said oven chamber according to a predetermined flow pattern providing substantially uniform treatment of said goods.

2. The oven of claim 1 wherein said conduit means includes adjusting means for adjusting said paths.

3. The oven of claim 1 wherein said oven chamber is rectangular in horizontal cross section having a front wall including a door, an opposing rear wall, and opposing side walls separating said front and rear walls.

4. The oven of claim 1 wherein said rotor means rotates in a continuous motion.

5. The oven of claim 1 wherein said rotor means rotates in a discontinuous motion.

6. The oven of claim 1 wherein said conduit means comprises duct means for receiving said medium from said rotor means, louver means providing slots for the passage of said medium into said oven chamber, and port means providing a passage between said duct means and said louver means.

7. The oven of claim 6 wherein said port means is so disposed relative to said duct means and said louver means that delivery of treating medium from said rotor means to a pair of adjacent duct means provides a crosscurrent flow pattern of said medium across said oven chamber.

8. The oven of claim 6 wherein said port means is so disposed relative to said duct means and said louver means that delivery of treatment fluid from said rotor means to opposed duct means provides oppositely directed flow patterns of said medium across said oven chamber.

9. A convection oven comprising an oven chamber for receiving goods to be treated, conduit means providing a plurality of paths for conveying gaseous treating medium to the oven chamber and opening into the chamber at different places about the chamber periphery, the paths including a first pair of opposing louvers, and a second pair of opposing louvers, at least one of said first and second pairs having slots for passage of air into said oven chamber disposed at an angle of from 0° to 30° above the horizontal.

10. The oven of claim 6 wherein at least one of (a) said port means and (b) said louver means comprises adjustable means for adjusting said path.

11. A convection oven comprising an oven chamber for receiving goods to be treated, conduit means providing a plurality of duct means for conveying gaseous treaing medium to the oven chamber, and rotor means for sequentially delivering gaseous treating medium to said duct means during rotation of the rotor means, the rotor means comprising a first opening for delivering treating medium to said duct means and a second opening isolated from said first opening for receiving treating medium from said duct means for distribution of the treating medium through the oven chamber according to a predetermined flow pattern providing substantially uniform treatment of said goods.

12. A convection oven for heat treating goods comprising an oven chamber, heating means for heating gaseous treating fluid, blower means for directing said heated fluid under pressure, rotor means for receiving said heated fluid from said blower means, a plurality of stationary ducts, said rotor means supplying heated fluid to and withdrawing heated fluid from said ducts sequentially during rotaton of said rotor means, fluid directing means located in the walls of said oven chamber to direct the gaseous fluid into the chamber, and port means providing a passage between the latter means and said ducts whereby a predetermined flow pattern of heated fluid across said oven chamber is provided sufficient to afford substantially uniform heat treatment of said goods.

13. The oven of claim 12 wherein said oven further comprises passage means between said blower means and said rotor means providing a passage for said heated fluid from said blower means to said rotor means, said passage means extending into said rotary means in noncontacting relationship to said rotor means.

14. The oven of claim 12 wherein said fluid detecting means are adjustable.

15. A convecton rack oven for treating goods with gaseous treating medium comprising an oven chamber dimensioned to receive a rack bearing goods to be treated, said oven chamber including a plurality of louvers located in at least one sidewall of said oven chamber for passage of treating medium therethrough, said louvers having a continuous, longitudinally extending opening, said opening having an upward pitch of greater than 0° and less than about 30° relative to the horizontal.

16. A convecton oven comprising a stationary oven chamber for receiving goods to be treated, conduit means including at least two pairs of separate duct means having respective openings into the oven chamber distributed about the chamber periphery with the openings of each pair disposed at opposite sides of the chamber; and rotatable rotor means sequentially delivering gaseous treating medium to the duct means for delivery of the medium into the oven chamber from sequential duct openings, and providing simultaneous withdrawal of the heating medium from ducts opposed from the delivery ducts.

17. The oven of claim 16 in which the rotor means comprises a first opening for delivering treating medium sequentially to the duct means, and a second opening isolated from the first opening for receiving treating medium from opposed duct means.

* * * * *